United States Patent
Leiber et al.

(10) Patent No.: US 10,250,098 B2
(45) Date of Patent: Apr. 2, 2019

(54) BEARING ARRANGEMENT IN AN AXIAL DRIVE WITH DUAL STATORS AND ONE ROTOR

(71) Applicant: IPGATE AG, Pfaffikon (CH)

(72) Inventors: Heinz Leiber, Oberrexingen (DE); Valentin Unterfrauner, Munich (DE); Thomas Leiber, Munich (DE)

(73) Assignee: IPGATE AG, Pfäffikon (CH)

( * ) Notice: Subject to any disclaimer, the term of this patent is extended or adjusted under 35 U.S.C. 154(b) by 312 days.

(21) Appl. No.: 14/395,619

(22) PCT Filed: Apr. 11, 2013

(86) PCT No.: PCT/EP2013/057609
§ 371 (c)(1),
(2) Date: Oct. 20, 2014

(87) PCT Pub. No.: WO2013/156391
PCT Pub. Date: Oct. 24, 2013

(65) Prior Publication Data
US 2015/0076972 A1 Mar. 19, 2015

(30) Foreign Application Priority Data

Apr. 20, 2012 (DE) .................. 10 2012 103 506
Jan. 25, 2013 (DE) .................. 10 2013 100 741

(51) Int. Cl.
*H02K 13/00* (2006.01)
*H02K 5/16* (2006.01)
(Continued)

(52) U.S. Cl.
CPC ............ *H02K 5/16* (2013.01); *B60T 13/741* (2013.01); *B60T 13/745* (2013.01); *H02K 7/06* (2013.01);
(Continued)

(58) Field of Classification Search
CPC ............ H02K 7/06; H02K 7/08; H02K 7/085; H02K 7/116; H02K 11/22; H02K 5/16;
(Continued)

(56) References Cited

U.S. PATENT DOCUMENTS 4,812,723 A * 3/1989 Shimizu ................ B60T 13/745
303/114.1
4,948,091 A 8/1990 Satoh et al.
(Continued)

FOREIGN PATENT DOCUMENTS

DE 1953272 U 1/1967
DE 3411745 * 10/1985 ............. F16D 65/18
(Continued)

OTHER PUBLICATIONS

DE 3411745 English Translation.*
(Continued)

*Primary Examiner* — Bernard Rojas
*Assistant Examiner* — Maged M Almawri
(74) *Attorney, Agent, or Firm* — Panitch Schwarze Belisario & Nadel LLP

(57) ABSTRACT

The invention relates to a drive device, particularly comprising an internal rotor motor, with a motor housing, a stator for a winding and a rotor having at least one permanent magnet, wherein the motor housing has a housing part extending substantially radially on one side of the stator and the rotor has two rotor bearings. The rotor bearings are arranged on the substantially radially extending housing part or on a part connected thereto which extends substantially axially.

29 Claims, 7 Drawing Sheets

(51) Int. Cl.
*B60T 13/74* (2006.01)
*H02K 7/06* (2006.01)
*H02K 7/08* (2006.01)
*H02K 7/116* (2006.01)
*H02K 11/22* (2016.01)

(52) U.S. Cl.
CPC ............... *H02K 7/08* (2013.01); *H02K 7/085* (2013.01); *H02K 7/116* (2013.01); *H02K 11/22* (2016.01)

(58) Field of Classification Search
CPC .. H02K 5/01; H02K 5/06; H02K 5/15; H02K 5/173; H02K 5/1735; H02K 5/1737; H02K 5/24; H02K 7/081; H02K 7/086; H02K 7/088; H02K 7/10; H02K 7/1166; H02K 7/1815; B60T 13/741; B60T 13/745
USPC ..... 188/72.1–72.8; 310/68 B, 83, 99, 98, 90, 310/90.5, 91, 12.31, 425, 89
See application file for complete search history.

(56) References Cited

U.S. PATENT DOCUMENTS

| | | | | |
|---|---|---|---|---|
| 5,829,557 | A | * | 11/1998 | Halasy-Wimmer ........................ B60T 13/741 188/162 |
| 6,230,492 | B1 | * | 5/2001 | Kingston .............. B60T 13/745 60/545 |
| 6,318,512 | B1 | * | 11/2001 | De Vries ................. F16D 65/18 188/162 |
| 6,325,182 | B1 | | 12/2001 | Yamaguchi et al. |
| 6,355,999 | B1 | | 3/2002 | Kichiji et al. |
| 6,453,761 | B1 | * | 9/2002 | Babinski ................. H02K 7/06 29/898.06 |
| 6,491,140 | B2 | * | 12/2002 | Usui ....................... F16D 65/18 188/158 |
| 2005/0155444 | A1 | * | 7/2005 | Otaki .................... B60T 13/746 74/89 |
| 2006/0151260 | A1 | * | 7/2006 | Drennen ............... B60T 13/741 188/72.1 |
| 2007/0007476 | A1 | * | 1/2007 | Gauss .................... F16K 1/123 251/129.11 |
| 2011/0031074 | A1 | * | 2/2011 | Ishii ..................... B60T 13/662 188/156 |
| 2013/0213163 | A1 | * | 8/2013 | Nakamura ............. H02K 37/14 74/89.34 |

FOREIGN PATENT DOCUMENTS

| | | | |
|---|---|---|---|
| DE | 3915526 | A1 | 8/1990 |
| DE | 19733566 | A1 | 2/1999 |
| DE | 19740867 | A1 | 3/1999 |
| DE | 19757038 | A1 | 5/1999 |
| DE | 19902371 | A1 | 8/2000 |
| DE | 19955452 | A1 | 5/2001 |
| DE | 69808760 | T2 | 8/2003 |
| DE | 10314394 | A1 | 10/2004 |
| DE | 102004040226 | A1 | 3/2006 |
| DE | 60302444 | T2 | 7/2006 |
| DE | 102005007875 | A1 | 8/2006 |
| DE | 102005055751 | A1 | 11/2006 |
| DE | 102005040389 | A1 | 3/2007 |
| DE | 102008059862 | A1 | 4/2010 |
| DE | 102008063772 | A1 | 6/2010 |
| DE | 3411745 | * | 9/2010 ............ B60T 13/741 |
| DE | 102009014340 | A1 | 9/2010 |
| DE | 102011002565 | A1 | 8/2011 |
| DE | 102010044754 | A1 | 3/2012 |
| DE | 102010045617 | A1 | 3/2012 |
| DE | 102010050132 | A1 | 5/2012 |
| DE | 102011106626 | A1 | 12/2012 |
| DE | 102011112515 | A1 | 2/2013 |
| EP | 0886076 | A2 | 12/1998 |
| WO | 9827356 | A1 | 6/1998 |
| WO | 2006074326 | A2 | 7/2006 |

OTHER PUBLICATIONS

Office Action dated Mar. 22, 2013 in DE Application No. 10 2012 103 506.7.
Search Report dated Jun. 20, 2013 in DE Application No. 10 2013 100 741.4.
Rolling Bearings—Angular contact radial ball bearings—Part 4: Single row, double direction—not self-locking, with double-split inner ring (Feb. 2008).
Int'l Search Report and Written Opinion dated Jul. 3, 2013 in Int'l Application No. PCT/EP2013/057609.
Int'l Preliminary Report on Patentability dated Oct. 30, 2014 in Int'l Application No. PCT/EP2013/057609.

* cited by examiner

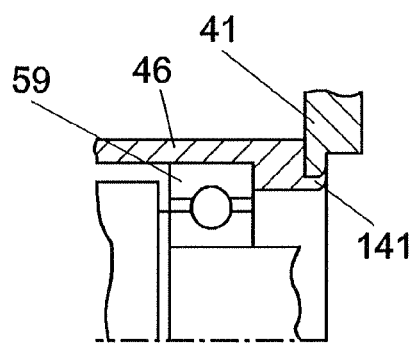
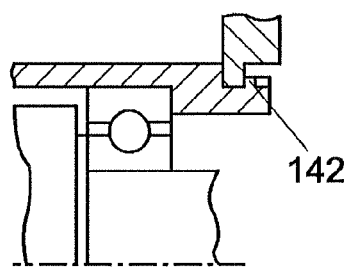
Fig. 9a          Fig. 9b
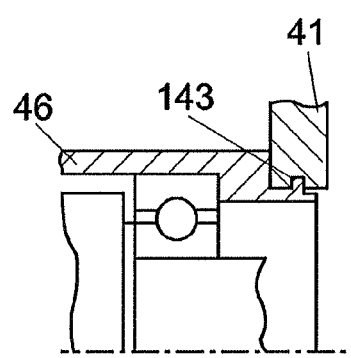
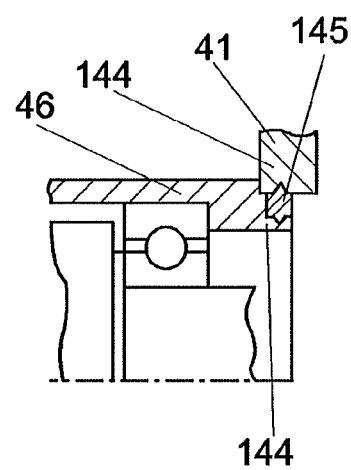
Fig. 9c          Fig. 9d

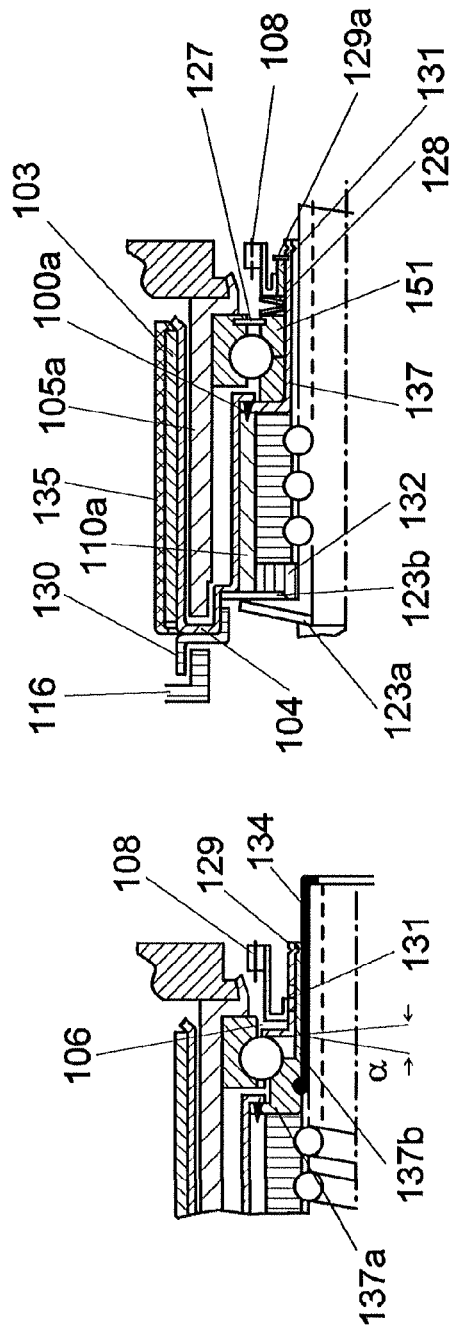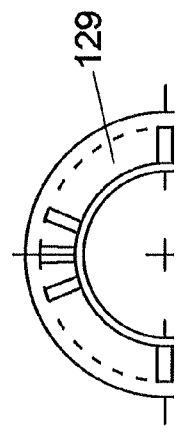

BEARING ARRANGEMENT IN AN AXIAL DRIVE WITH DUAL STATORS AND ONE ROTOR

CROSS-REFERENCE TO RELATED APPLICATIONS

This application is a Section 371 of International Application No. PCT/EP2013/057609, filed Apr. 11, 2013, which was published in the German language on Oct. 24, 2013, under International Publication No. WO 2013/156391 A1 and the disclosure of which is incorporated herein by reference. International Application No. PCT/EP2013/057609 claims priority to German Patent Application No. 10 2012 103 506.7, filed on Apr. 20, 2012, and German Patent Application No. 10 2013 100 741.4, filed Jan. 25, 2013, both of which are also incorporated by reference herein.

BACKGROUND

The invention relates to a drive device, in particular having a motor and a gear transmission.

The demand for highly dynamic drives is rising with the increasing electrification of the motor vehicle and also in general mechanical engineering. Examples are electric actuators for brakes, chassis suspensions, steering and robotics.

In line with the trend for electrifying all sectors of industry, more and more electric motors (EM) are being used as actuating drives. This particularly applies for electric motors (EM) having a spindle drive and a ball screw assembly. In automotive engineering, in particular in future brake systems, such as integrated systems and electromechanical braking (EMB) for a) drives of the brake linings and b) drives for pistons. In both cases, a suitable bearing support for the rotor and the spindle is required.

In DE 10 2005 040389 A1, a motor concept is described which has a considerably smaller rotating mass than other comparable motors by the magnets being attached to a thin-walled rotor and the magnetic back iron occurring via a second air gap via a fixed inner stator. However, due to bearing support on both sides with two inner stators the assembly is more complex in comparison to the conventional motor with rotating back iron and one air gap.

With many drives, the rotational movement is translated into a linear movement via a ball screw assembly with a nut and screw spindle. Here, the rotating mass of the nut forms part of the dynamics. In addition, with this drive it is necessary to support the torque and to provide a spring for resetting the screw spindle to the starting position.

In the case of the device according to DE 10 2010 045617 of the applicant, normally the ball screw assembly and the bearing are only stressed from one side by positive axial forces which essentially occur by means of the compressive force on the piston. However, relatively small radial forces of approximately 10% also act on the bearing support. The occurrence of a fault, however, when e.g. the piston push rod jams, has to be taken into consideration. Here, the pedal force acts on the piston push rod such that a negative axial force acts on the ball screw assembly and the bearing support. A further fault can occur when the rotor impinges on the sharp-edged stator tooth, which can result in the rotor becoming blocked and hence the drive. When all these faults occur, the effect of the secondary braking should be functional. These fault occurrences are very rare and are recognised by the diagnostics. The vehicle must then be taken for a service.

A typical use of an integrated four-point contact bearing for the ball screw assembly is also already known from DE 197 57 038, in which the rotor is supported on the ball screw assembly. The rotor and sensor drive are arranged on one side of the ball screw assembly.

DE 10 2008 059 862 and DE 10 2010 050 132 use two bearings for the rotor and the ball screw assembly, in which the rotor is arranged on one side of a bearing and the sensor drive is arranged on the other side.

BRIEF SUMMARY OF THE DISCLOSURE

The invention is based on the object of producing an improved drive device for a highly dynamic drive, in particular with reduced effort in terms of construction.

This object is achieved according to the invention by the features as found in the attached claims.

In other words, the invention is based on the basic concept of arranging the rotor bearings on only one side in the motor housing or in the corresponding housing part, so that the bearing forces (at least substantially) are absorbed by this housing part.

One embodiment of the invention makes provision for the bearing(s) to be arranged on a component connected to or integrated with the rotating gear transmission part, in particular a bearing flange.

In the case of electromotive drives of the type mentioned in the introduction, a short overall length and a small air gap of the motor is often very important. This is achieved according to the invention by the stator with winding and motor housing having the same length as or being shorter than the rotor with transmission. Relating to this, the one-sided bearing support between the transmission and sensor drive in a bearing ring is the shortest possible and at the same time the bearing support in a bearing ring with an attachment in the motor housing. If, in addition, the bearing flange is integrated into the transmission and the bearing support is combined with the bearings, the smallest radial tolerances can also be obtained which determine the air gap of the motor.

Furthermore, with the solution according to the invention a drive device is created with a less complex design, and in particular also with a simple bearing support for the motor, with a tolerance chain which is as small as possible and reduced rotating mass. In the case of solutions with ball screw assemblies, favourable integration possibilities and torque support arise by means of just the one-sided bearing support of the rotor and the ball screw assembly.

An important structural element for precise motor control is a sensor which is preferably arranged on the outside of the motor housing, since many sensor solutions can thereby be used, such as gear-wheel driven rotational speed sensors or segment sensors with a corresponding sensor target. According to one aspect of the invention, a bearing support is created for the sensor which is advantageously arranged between the transmission and the sensor drive. As a result, the other side of the gear transmission can be occupied by a drive, e.g. for the piston of a master cylinder of a braking system. To economise on overall length, parallel to this a torque support is most advantageous, since the travel on the torque support is the same as the piston travel or the screw spindle travel of a ball screw assembly.

Due to the one-sided bearing support, the bearing-free side can be fully used for the torque support and also in combination with a screw spindle return spring. The one-sided bearing support encompasses the rotating mass which essentially consists of the rotor and the nut of the ball screw assembly firmly connected to the rotor and, where appropriate, a flange for driving a motor sensor. The rotating mass should be as small as possible, since it co-determines the dynamics of the drive. For this purpose, advantageous solutions, in particular with regard to the rotor and ball screw assembly, are proposed. Various possibilities are proposed for configuring the one-sided bearing support consisting of fixed bearings and movable bearings. With regard to fixed bearings: thrust bearings and radial bearings. With regard to movable bearings: radial needle bearings. Or a combination of fixed and movable bearings, e.g. thrust bearings and radial bearings; two thrust bearings with support ring in case of a fault; four-point contact bearings with split or non-split inner or outer ring, in some cases with additional support ring.

Here, the flange or the shaft connected to the nut of the ball screw assembly takes the inner bearing. The outer bearing is mounted in the motor housing or particularly advantageously in the case of motors with one air gap in a bearing ring or with a double air gap in the inner stator. This bearing ring is advantageously connected in a positive fit manner to the motor housing. The tolerance chain from the bearing flange to the stator inner diameter which determines the air gap affecting the efficiency is important. This tolerance chain can be kept particularly small if e.g. in the case of a four-point contact bearing the outer bearing ring can be produced and inspected combined with the bearing ring or inner stator and the flange is connected to the nut of the ball screw assembly. The same applies for the run-out of the sensor wheel or sensor target if this is directly supported on the flange connected to the nut of the ball screw assembly.

It is important for the bearing support in normal operation to have a high transverse rigidity with respect to radial forces of about 10% of the axial force. This is achieved both with thrust bearings and four-point contact bearings. For axial forces in both directions, the thrust bearing requires another second bearing, which is not necessary with a four-point contact bearing. If this, however, is to be safe against tilting in the case of axial and radial forces, adapting the tolerances of the split outer or inner rings is expensive. In order to avoid this, simplified bearing supports or inner ring solutions are proposed. Using the invention and its embodiments, a simplified bearing support with high transverse rigidity and low tolerances with respect to the stator and run-out of the sensor wheel or sensor target and safety against the rotor touching slightly against stator teeth is provided.

In the introduction, rare fault occurrences were touched upon, in which positive and negative axial forces occur. Since the negative axial forces only rarely and briefly occur with radial forces, a simplified support ring can be used which incorporates or guarantees the radial centring and transverse rigidity. This support ring can also be used if in the case of tolerance violation and radial load the rotor catches in the sharp-edged stator and blocks the drive or as a support of the rotor in the case of extreme shock or impact load. The invention and its embodiments therefore also ensure that the bearing support can absorb forces occurring in rare cases in the opposite direction of the compressive force of the piston originating from the pedal push rod. Furthermore, solutions are provided which prevent the rotor catching on the stator.

The screw spindle of the ball screw assembly is greased and gathers dirt or wear debris quickly. These can originate from the rotor or the gear drive or from the surrounding housing. A protection on the rotor and on the flange a protective sleeve for the screw spindle are proposed to combat these. Solutions are also outlined to seal the bearings against dirt particles and grease loss.

The rotor must be connected to the ball screw assembly, in order to transfer the motor torque reliably and free from backlash. For this purpose, it is proposed to: press on or bond the rotor; weld or screw on the rotor.

With the solution according to the invention and its embodiments, a drive or motor design with a compactly designed bearing support with integrated ball screw assembly is provided. Realistic faults and influences are also taken into consideration. The basic design elements are considered in their entirety.

The bearing support and the rotating mass play an important role in terms of the effort required. These take place on one side in the motor housing. With the so-called movable bearing, the inner stator or the ball screw assembly nut is assembled with the bearing element. The inner stator and the motor bearing form with the motor housing a structural unit, into which preferably the fixing in place of the stator is incorporated. Many tolerances are reduced by the solution according to the invention because the bearing seats of movable and fixed bearings can be manufactured in one setting by machining or injection-moulded. The fixed bearing is seated in the motor housing. The axial bearing support is effected when a ball screw assembly with screw spindle is used appropriately in the main direction of force of the screw spindle via a thrust bearing of the rotor together with the fixed bearing for the other direction. Here, both antifriction bearings and friction bearings can be used as the bearing element. This construction is suitable both for a conventional motor with only one air gap between the rotor and the stator and, still better, for a motor with two air gaps, as is described in DE 10 2005 040389 A1 of the applicant.

By means of this construction, in the case of the motor with two air gaps only a thin-walled rotor with magnets and a fixed back-iron ring is necessary, to be equivalent to or more advantageous than the conventional motor which additionally requires a second bearing bracket with corresponding effort and tolerances. Here, the ball screw assembly can be integrated into the bearing support. In the case of the motor with one air gap, the inner stator forms a bearing sleeve or bearing ring and the rotor also includes the rotating back-iron ring and is therefore larger in terms of rotating mass.

Although motors with only a one-sided bearing support are already known, see e.g. DE 199 02 371 A1, these are completely different from the invention in terms of construction and performance, so that a comparison cannot be made in a meaningful way.

In addition to the design, with regard to the invention and its embodiments the rotating mass should be further reduced compared to the motor described in DE 10 2005 040389 A1. Here, the ball screw assembly nut is included. The rotating mass can be optimised by an open ball screw assembly nut with flanges which are as thin as possible for receiving or fixing the rotor in place. The ball return is effected in a lightweight retainer consisting of plastic which is arranged in a recess, which is in particular radially open to the outside, within the ball screw assembly nut. Here, an axially parallel ball guidance can be effected and in the transverse direction to the axis at an angle of 30°-45° to the axis. As is generally known, the design of the guidance of the balls out of the screw spindle as well as into the screw spindle is important. In addition to the single-row ball return a double-row ball return should also be possible. In order to reduce the rotating mass, the ball screw assembly nut is additionally integrated with the rotor and the motor bearing support. This is advantageously effected by a simple rotor which is connected to the ball screw assembly flange on the end face, in particular welded on, and an extension of the ball screw assembly nut as a bearing sleeve for the fixed bearing.

The torque (Md) of the motor is determined by the adjustment performance in the case of a linear drive, i.e. in which unit of time a force is generated over a certain path. If additionally the force is used alternatingly dynamically, then for this purpose a split torque requirement arises. To that end, an example from brake technology is provided below.

Md1 for the pressure build-up: here, the spindle moves the master cylinder piston. Target value 200 bar in e.g. 200 ms, which e.g. requires 5 Nm from the motor. Md2 for the pressure modulation in both directions corresponding to multiplex (MUX), as is described in more detail in DE 10 2005 055751 A1 of the applicant, to which reference is also made here in this respect for disclosure purposes: in the case of a certain rotating mass 5 Nm are likewise required.

If now the rotating mass is considerably reduced, e.g. 50%, then Md2 is considerably smaller. Hence, the thread pitch can be reduced for Md1, which requires a low torque from the motor. Hence, the motor with a specified radius of the rotor becomes correspondingly shorter, which reduces material and additional expensive magnet costs and weight. That is to say, the reduction in the rotating mass plays an important role. Here, the motor with one air gap is more disadvantageous than the motor with two air gaps, but due to this design and an open integrated ball screw assembly it is still considerably better than the conventional motor.

In addition to the above, the drive with a ball screw assembly requires a torque support and a screw spindle return. These can easily be realised in an intermediate housing, preferably consisting of plastic, for the drive, e.g. TMC housing.

With the invention and its embodiments, also in terms of production and assembly a surprisingly simple, cost-effective and highly dynamic drive is provided which enables a motor with a lower torque and overall length to be presented. The higher rotational speed is solved by the known measures, such as winding and phase switching. Two separate windings per tooth are also conceivable, which additionally means a redundancy for the failure of a winding or activation.

The invention and its embodiments provide a one-sided bearing support for the rotor and the ball screw assembly for use both with motors with one air gap and with motors with two air gaps.

Various bearing arrangements with thrust bearings and radial bearings, in particular with bearing preloading, e.g. by means of a wave spring washer and support ring, are provided. Advantageously, e.g. two thrust ball bearings with support ring and axial clearance can be provided. A four-point contact bearing with a closed or split inner or outer ring can advantageously also be provided. Such four-point contact bearings are superior with correct positioning with regard to overall length and changing axial load.

Advantageously, the track of a thrust ball bearing can be provided on the nut of the ball screw assembly. In a further embodiment, provision is made for the bearing to be integrated into a housing part of the motor or a component firmly connected to it. The component can be appropriately connected in a form-fit manner to the housing part by caulking, crimping or press-fit caulking.

According to a further embodiment, a support ring can be provided between rotating parts and parts fixed to the housing, in particular on the nut of the ball screw assembly, the motor housing or the component firmly connected to it, or on the stator.

With these embodiments, a simplification of the bearing support with high transverse rigidity and low tolerances with respect to the stator and run-out of the flange to sensor wheel or sensor target and safety against the rotor touching slightly against the stator is provided.

Listed below are further advantages which arise using the solution according to the invention and its embodiments:

a short overall length;

the bearing is integrated into a bearing sleeve or bearing shell;

small bearing tolerances from bearing to rotor;

screw spindle stop for incorrect motor control as overload protection for ball screw assembly and bearing (impact load);

screw spindle protection against foreign particles which stick to the greased screw spindle and can lead to blocking;

assembling the rotor by means of welding or force-fit and form-fit connection;

fully inspectable assembly unit consisting of the ball screw assembly and bearing with sensor wheel;

the second inner ring or outer ring of the bearing is replaced by a spring washer which is preferably integrated into a gear wheel carrier for a motor sensor;

external sealing of the four-point contact bearing, in order to prevent loss of grease at higher temperatures.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 9a-9d show different arrangements or attachments of the bearing sleeve to the housing;

FIG. 11 shows a detail with integration of the ball screw assembly into the rotor and bearing support for a motor with two air gaps;

FIG. 11a shows a view of a form-fit connection between a gear wheel carrier and a bearing part;

FIG. 12 shows a detail with integration of the ball screw assembly into the rotor and bearing support for a motor with two air gaps, in which various additional measures are illustrated.

DETAILED DESCRIPTION OF EMBODIMENTS OF THE INVENTION

Figure 1:
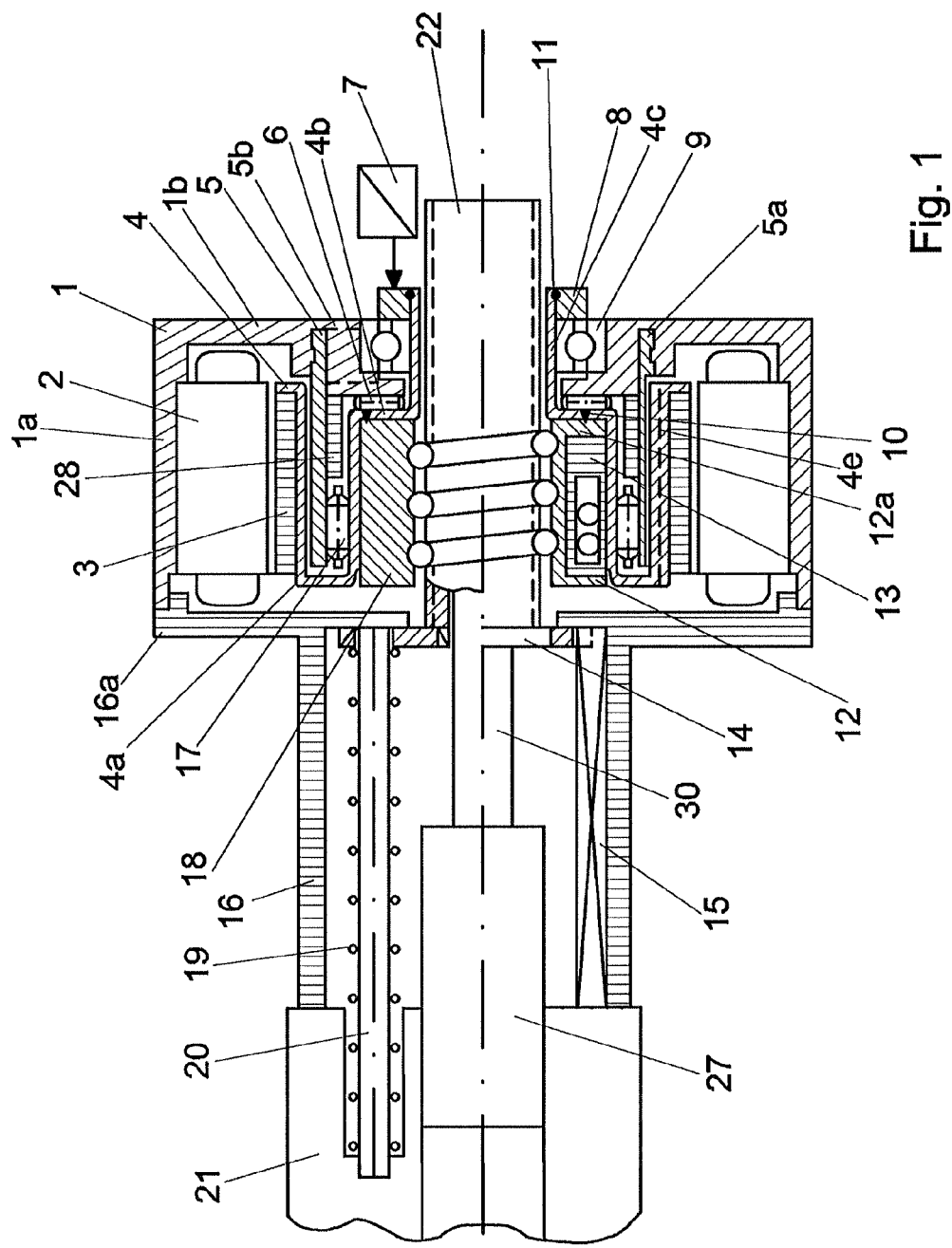
FIG. 1 shows the basic construction of the one-sided bearing support with a motor with one air gap (lower half) and with a motor with two air gaps (upper half)

FIG. 1 shows the basic construction of the motor with a one-part motor housing 1, stator with winding 2, rotor 4 with permanent magnet 3, ball screw assembly 18 and screw spindle 22. In contrast to the prior art, the rotor is supported via a needle bearing or friction bearing 17 in the inner stator 5 and in the fixed bearing 9 in the motor housing.

The motor housing 1 is essentially formed in a U-shape in longitudinal section with a cylindrical wall part 1a and a radial side wall part 1b. On the side opposite the side wall part 1b, a radial wall part 16a of an intermediate housing 16 is arranged and connected to the cylindrical wall part 1a of the motor housing, so that the motor and the ball screw assembly are enclosed.

The rotor 4 has both in the case of the motor with one air gap and in the case of the motor with two air gaps in longitudinal section an essentially U-shaped section 4a, to the outer leg of which the permanent magnets 3 are attached. The inner leg of the U-shaped section and the leg 4b abut on the outside of the ball screw assembly nut. In the upper part of the figure, the outer leg is thin-walled and carries the magnets and absorbs a part of the back iron. Following this, a radial section 4b is provided which is attached to the end face of the ball screw assembly nut, in particular by means of welding. Finally, an axially parallel section 4c follows which abuts on the inside of the fixed bearing which is seated in a recess of the motor housing 1. A sleeve-like inner stator 28 is attached to one end in the motor housing and extends with its free end into the U-shaped section 4a of the rotor. This inner stator absorbs the rest of the back iron of the magnets.

In the lower half of the figure, the motor with one air gap is illustrated. Here, a bearing sleeve 5a is used instead of the inner stator. The rotor 4 is constructed with thick walls and receives the magnets, the back iron of which, in accordance with conventional motor technology, flows via the rotor casing. Here, for simplification a non-laminated rotor can also be used. The higher eddy-current losses are tolerable with many applications. A thin-walled rotor sleeve can also be used similar to with the motor with two air gaps, in which the back-iron ring 4e e.g. is pressed on.

The axial forces of the screw spindle are absorbed by means of a thrust-needle bearing 6 in the principal direction and by means of the fixed bearing 9 in the second direction with smaller forces. The bearings are arranged at or on the rotor sleeve. The sensor wheel 8 is fixed at 11 to the bearing sleeve, preferably by welding. The rotor sleeve is fixed at 10 to the ball screw assembly, likewise preferably by welding, but can also be pressed into a circumferential groove. The radial bearing 17 is axially kept at a distance by means of a sleeve 28 or a corresponding design of the inner stator 5. In order to reduce the rotating mass, the ball screw assembly 18 is provided with a recess 18a, as can be seen in the lower half of the figure, which is left open to reduce weight or optionally to receive a ball retainer 13, wherein the two narrow flanges 12 and 12a limiting the recess form lateral limits of the recess. These flanges in design are formed for minimal rotating mass. The ball return is effected in a ball retainer, preferably in a plastic retainer. The ball return can be effected in a single-row or double-row parallel or at a certain angle to the axis of 30-60°. This open design can reduce the rotating mass of the ball screw assembly by up to 70%. By means of this bearing support, the tolerance chain is also small with the motor with two air gaps and also in the number of parts comparable with the conventional motor with one air gap. It is also advantageous for the housing dimensions to be able to be machined in one setting, provided the inner stator is injection moulded in a die cast housing. The air gap between the rotor and the stator has a large influence on the torque. Here, the tolerance chains in the housing 1, inner stator 5 and seat of the fixed bearing 9 and rotor 4 with magnet 3, bearing seat for radial bearing 17 and fixed bearing 9 are the significant dimensions. Here, it is advantageous for the tolerance chain in the motor housing to be able to be machined in one setting and likewise for the rotor 4 for the bearing seats and support of the magnets to be able to be machined in one setting.

By corresponding structuring of the motor housing, the part with the inner stator can be completely injection moulded from plastic without subsequent processing being required, which means enormous reductions in cost and weight. The inner stator can also be combined with the bearing seat 5b. It can also be advantageous together with the inner stator or the bearing sleeve to inject mould the stator with winding in the plastic housing part receiving the bearings. This also applies, with a corresponding design of the bearing sleeve, for the motor with one air gap. For many applications, e.g. braking, the thermal load is not high, so that the heat dissipation is insignificant. Where necessary, this can be improved by an injection-moulded Al sleeve (not illustrated) which accommodates the stator. In order to control the individual phases and position the drive, the motor requires a sensor which is activated via the sensor wheel 8. Here, a variety of sensors can be used, e.g. from gear-wheel driven rotation angle sensors to the segment sensor.

The screw spindle drive requires a reset which is connected particularly easily by means of a coupling flange 14 which is supported axially and torque-proof by the screw spindle. The reset spring 19, preferably two pieces, is supported on the flange 14 and is guided in the guiding bolt 20 which is mounted in the housing 21 or also additionally in the intermediate housing 16.

The torque is supported via the same coupling flange 14 which preferably grips two supports which are preferably offset by 180°.

The drive element 27, e.g. a piston, is preferably actuated by a coupling element 30 which is connected to the screw spindle 22.

Figure 2:
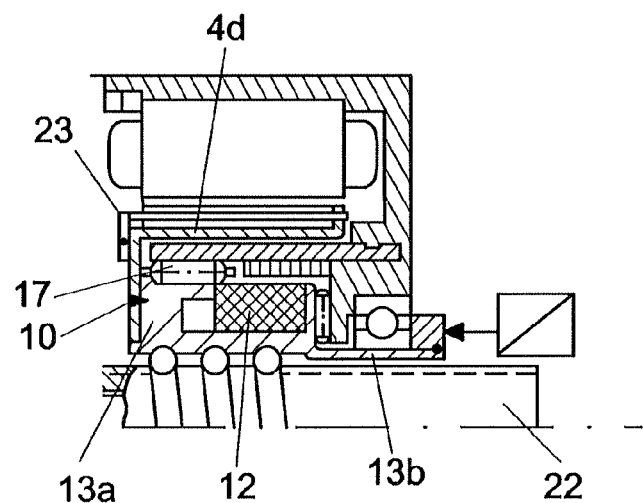
FIG. 2 shows a detail with integration of the ball screw assembly into the rotor and bearing support for a motor with two air gaps.

FIG. 2 shows a detail of the rotor and the stator in the case of a motor with two air gaps. In order to reduce the rotating mass further, a simplified rotor 4d is fixed at 10 on the end face on flange 13a of the ball screw assembly nut. The preferably form-fit connection can be effected by means of welding, riveting or caulking A form-fit connection can also be effected on the circumference of the flange by means of a groove and corresponding shaping of the rotor sleeve. Here, the flange is correspondingly prepared, e.g. from unhardened material or a soft material zone. In addition, the bearing sleeve 13b connected to the ball screw assembly nut 18 takes the rotor bearing support on the fixed bearing. This bearing sleeve 13b can be formed as a separate part and correspondingly 4a fixed in place with the ball screw assembly flange and connected. Additionally, a fixing sleeve 23 with spacer pins can be attached to the rotor for fixing the magnets in place. These grip on the end face, see FIG. 3, through corresponding openings in the rotor and can be produced appropriately from metal or plastic.

Figure 3:
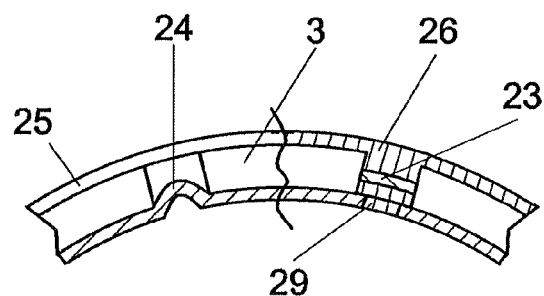
FIG. 3 shows a detail from the rotor.

FIG. 3 shows a detail from the rotor with fixing of the magnets 3 in place effected by means of pins 23 or indentations 24. The magnets are advantageously protected by a protective sleeve 25 or corresponding overmould 26. Holes can be provided in the rotor to fix the overmould in place better.

Figure 4:
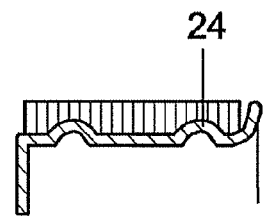
FIG. 4 shows a magnet attachment.

FIG. 4 shows a longitudinal section of a rotor with indentations which can be continuous over the entire magnet length or only at certain points.

Figure 5:
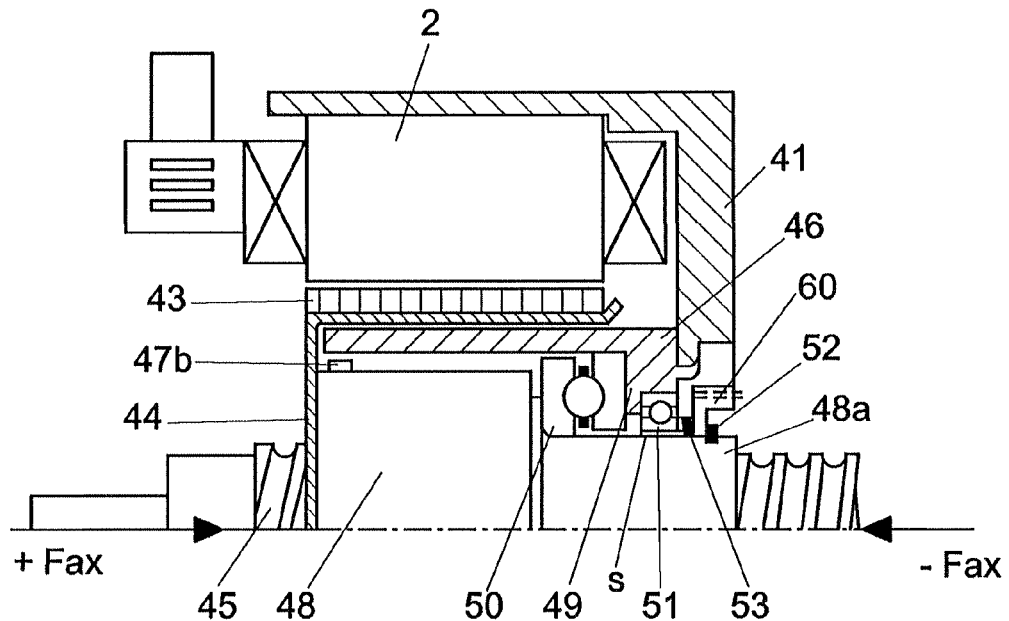
FIG. 5 shows a bearing configuration or arrangement with thrust and radial bearings.

In FIG. 5, the upper half of a drive is illustrated with in longitudinal section the essentially U-shaped motor housing 41, stator with winding 2, rotor 44 with permanent magnet 43, ball screw assembly with nut 48 and screw spindle 45. An essentially axially extending component or bearing ring 46 is attached to the radially extending wall of the motor housing 41. The component or bearing ring 46 forms an inner stator and acts as a magnetic back-iron ring and to that end extends into the rotor 44, wherein it runs with a small gap parallel to the axially extending leg of the rotor to close to the radially extending leg of the rotor. A short leg 49 extends from the component 46 at an angle of 90° inwards to close to the screw spindle 45 of the ball screw assembly. The stator is preferably contracted in the motor housing 41. The bearings 50, 51 are arranged on the component or bearing ring 46, wherein the bearing 50 is arranged on one side of the radially inwardly extending section 49 and the bearing 51 is arranged on the other side of this section. A component or bearing flange 48a is attached to the nut 48 of the ball screw assembly, preferably by means of a welded joint or screwed connection. The component or bearing flange or bearing sleeve 48a attached to the nut receives a ring of the thrust bearing 50 as free from play as possible and has a small radial clearance "s" with respect to the radial bearing 51, so that with a positively acting axial load Fax the thrust bearing 50 supports fully. At the end of the bearing flange, a gear wheel sensor target 60 is arranged on the bearing flange and is in particular pressed on and axially fixed in place with a locking ring 52. A wave spring washer 53 is arranged between the gear wheel 60 and the bearing 51, wherein optionally, e.g. by means of compensating washers, an axial clearance can be set and the bearing can be preloaded to reduce noise. If a fault with negative axial force −Fax occurs, then the radial support or bearing support is effected by means of a support ring 47b pressed onto the nut of the ball screw assembly 48. This fault occurrence is relevant if e.g. in the case of a braking device the piston push rod 146 (see FIG. 7) is activated by the pedal push rod 147, wherein it activates on the other side the piston of a master cylinder and the piston push rod jams in the screw spindle 45 of the ball screw assembly. Then, the pedal force acts on the bearing 51 via the screw spindle and via the compressed wave spring washer. Due to the low bearing friction, the nut of the ball screw assembly rotates and the screw spindle moves axially and acts on the master cylinder piston indicated by a dashed line.

The thin-walled rotor is attached to the nut 48 of the ball screw assembly, e.g. welded, but it can also be screwed on. Permanent magnets 43 are attached, in particular bonded, on the axially extending leg of the rotor. The permanent magnets can additionally be fixed in place by means of a plastic overmould (not illustrated) or are enclosed by a metal can. Instead of intricately setting the small axial clearance, a support ring 47b can be used which limits the pivot clearance in the case of a negative axial force, since the thrust bearing due to the clearance can no longer guide radially.

Figure 6:
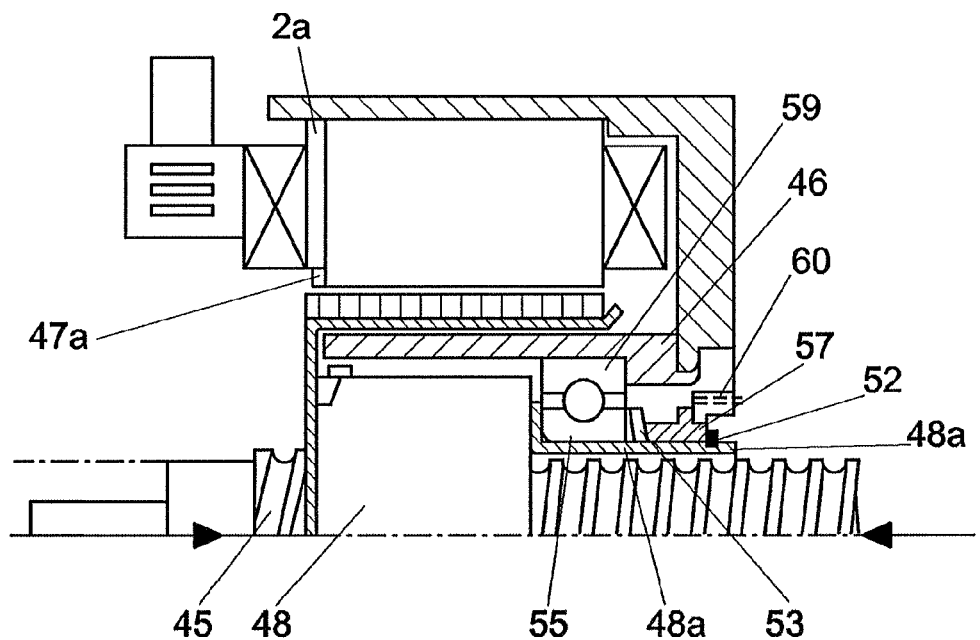
FIG. 6 shows a further bearing configuration or arrangement with non-split four-point contact bearing.

FIG. 6 shows a bearing support with a four-point contact bearing 55 with low clearance and hence low pivot clearance. So that the clearance is not affected by the bearing flange 48a, a (for assembly reasons) small clearance is provided between the inner ring of the bearing 55 and the flange 48a. The inner ring is axially secured with a wave spring washer 53 via an intermediate ring 57, which can also be a gear wheel carrier for a rotation sensor, and a locking ring 52 (see FIG. 5). As an alternative to the small clearances, here a relatively large pivot clearance can be provided, together with the support ring 47a on the stator or on the bearing ring. This support ring is seated within an additional stator blade 2a without a pole tooth and is appropriately attached by bonding or caulking. In order to prevent magnetic losses, this ring is magnetically non-conductive and can also additionally be correspondingly structured on the periphery to prevent eddy current losses. This support ring is also effective when tolerances are exceeded to prevent the rotor from catching on a sharp-edged pole tooth of the stator, for which reason the support ring appropriately forms a closed journal bearing.

Figure 7:
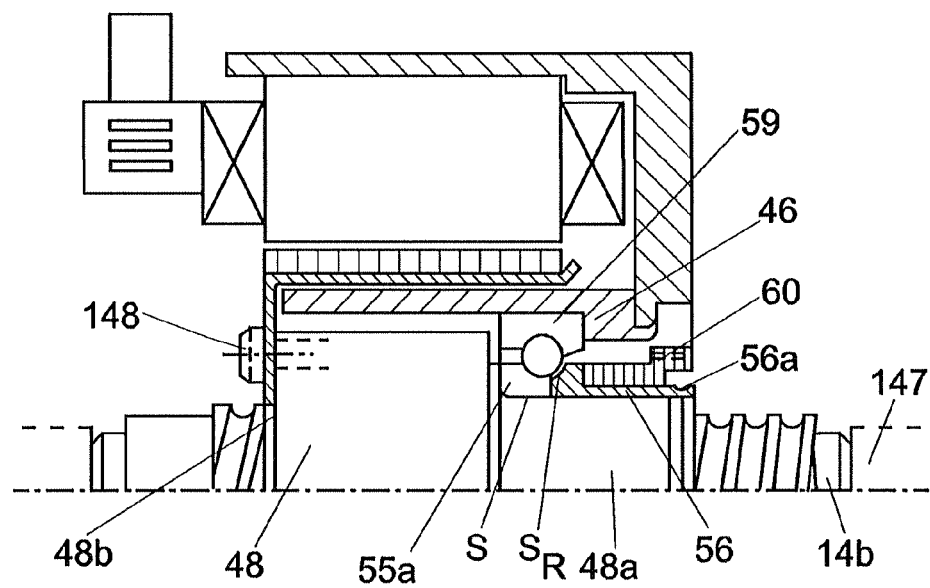
FIG. 7 shows a third bearing configuration or arrangement with split four-point contact bearing.
Figure 8:
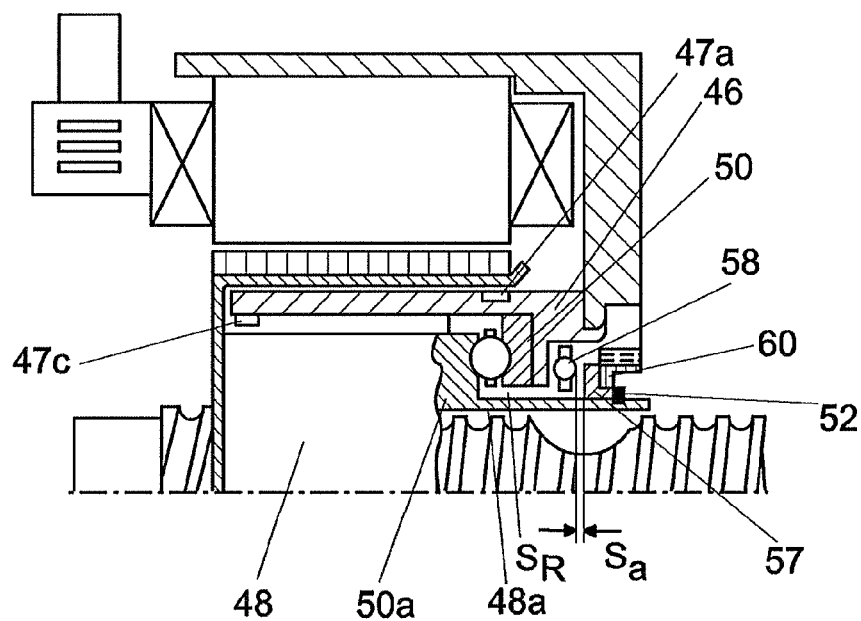
FIG. 8 shows a fourth bearing configuration or arrangement with thrust bearing.

FIG. 7 shows a bearing arrangement with a four-point contact bearing with split inner ring. The left inner ring 55a is connected to the bearing flange 48a by pressing or by a close sliding fit. It can, corresponding to FIG. 2, be a part of the nut of the ball screw assembly or be connected to the nut of the ball screw assembly, in particular welded on. Alternatively, it can preferably be produced as a deep-drawn part, as illustrated in FIG. 12, and constitutes the connection to the sensor drive 108 and, at the same time, is the bearing flange sleeve 137 for the bearing arranged on it. The tolerances are thereby relatively large and determine the bearing seat and run-out for the rotor and the sensor gear wheel or sensor target. Here, a solution according to FIG. 2 with integration of the flange with the ball screw assembly brings a considerable improvement which can be improved even more by integrating the ball track into the ball screw assembly (as illustrated in FIG. 8). In normal operation, a positive axial force +Fax acts via the bearing inner ring 55a over an angle of approximately 40 degrees to the bearing outer ring 59 like an angular contact ball bearing. In the case of a negative axial force in the rare case of a fault, the force acts in reverse from the bearing ring 55 again over approximately 40 degrees (after clearance compensation) to the outer ring 59. Hence, this bearing configuration acts like an angular ball bearing. In the description, the term four-point contact bearing has been retained due to the same design configuration.

The inner ring 56 in FIG. 7 is advantageously, and particularly for cost reasons, combined with a gear wheel carrier with a moulded on gear wheel 60, wherein the inner ring can be produced from unhardened steel due to the relatively low axial force and very rare operation. Axial fixing in place is effected by means of caulking the inner ring 56 into an indentation, in particular groove 56a of the bearing flange 48a. This solution can also be accomplished with a small clearance "s" even without a support ring, with clearance adjustment occurring via a corresponding device. Axial fixing in place can be effected via a force-fit or form-fit connection 56a, such as caulking or welding. The advantage of the split inner ring lies in the use of more balls which compared to the closed outer ring with inner ring in FIG. 6 increase the basic load rating of the bearing. It is appropriate, in particular with the solutions with four-point contact bearings, for the bearing ring or inner stator to be matched with the outer bearing ring and, where appropriate, to be manufactured and inspected together in order to guarantee small tolerances. Here, it is also important that the required close fit can be checked by measuring the contact force. This must withstand the negative axial force −Fax. This can be easily achieved by the inner diameter of the bearing ring 46 being greater than the inner diameter of the bearing ring 59.

FIG. 8 shows a solution with two thrust bearings 50, 58, wherein a ball track 50*a* is integrated into the nut of the ball screw assembly. The second thrust bearing can be a needle bearing (not illustrated) or a ball bearing. The latter has the advantage that the radial run-out of the flange is absorbed rolling and not sliding. Axially, a small clearance sa to the intermediate ring 57 with gear wheel carrier 60 is provided. Here, a small clearance can also be set as in FIG. 7 with a corresponding device. In the case of a fault with negative axial force and without a defined small clearance setting, the axial clearance results in the situation that the thrust bearing no longer radially guides in its ball track, for which reason advantageously a support ring 47*c* acting as an outer bearing is provided (or support rings 47*a*, 47*b* according to FIGS. 5, 6). The support ring can consist of a friction bearing or a ball bearing ring in this and in the other embodiments. Here, the ball track can also be directly integrated into bearing ring 46. Fixing in place is again effected by means of a locking ring 52. The support ring can also act on the outer diameter of the inner stator 47*d*, e.g. integrated into the bearing ring 46. In the case of a fault, an inner bearing is also useful as an emergency bearing. The second bearing ring 50 of the thrust bearing undertakes this, which with a small clearance SR engages with the bearing flange 48*a*.

The figures show a combination of fixed and movable bearings which are cost-effective and compact for all loading cases.

FIGS. 9*a* to 9*d* show possibilities for attaching the bearing ring 46 in the motor housing 41 or on its wall. As described, there is the advantage with the same expansion coefficient between the bearing outer ring (e.g. 59 in FIG. 7) and the bearing ring 46, e.g. consisting of steel, that no differing temperature expansion occurs. The greater temperature expansion of the motor housing consisting of aluminium or plastic would have a substantial effect on the small bearing tolerances if the bearing ring is part of the motor housing, i.e. consists of the same material. Then, these differing temperature expansions act fully on the bearing clearance. A negative axial force also cannot be reliably absorbed on the bearing. In contrast, the arrangement of the outer ring 59 in the bearing ring 46 brings the above-mentioned advantages.

FIG. 9*a* shows a crimping 141 of the bearing ring or inner stator 46 on the motor housing 41. This crimping can be carried out over the whole circumference or only on e.g. four segments. FIG. 9*b* shows caulking 142 on several segments. In FIG. 9*c*, the caulking 143 of material from the bearing ring 46 into the motor housing on different segments, e.g. four segments, is provided. In the embodiment according to FIG. 9*d*, the bearing ring 46 is centred in the motor housing by means of a collar. The motor housing 41 and the bearing ring 46 have small furrows or grooves. Into this, a ring 145, e.g. consisting of soft aluminium is deformed by pressing, so that a form-fit connection occurs.

Figure 10:
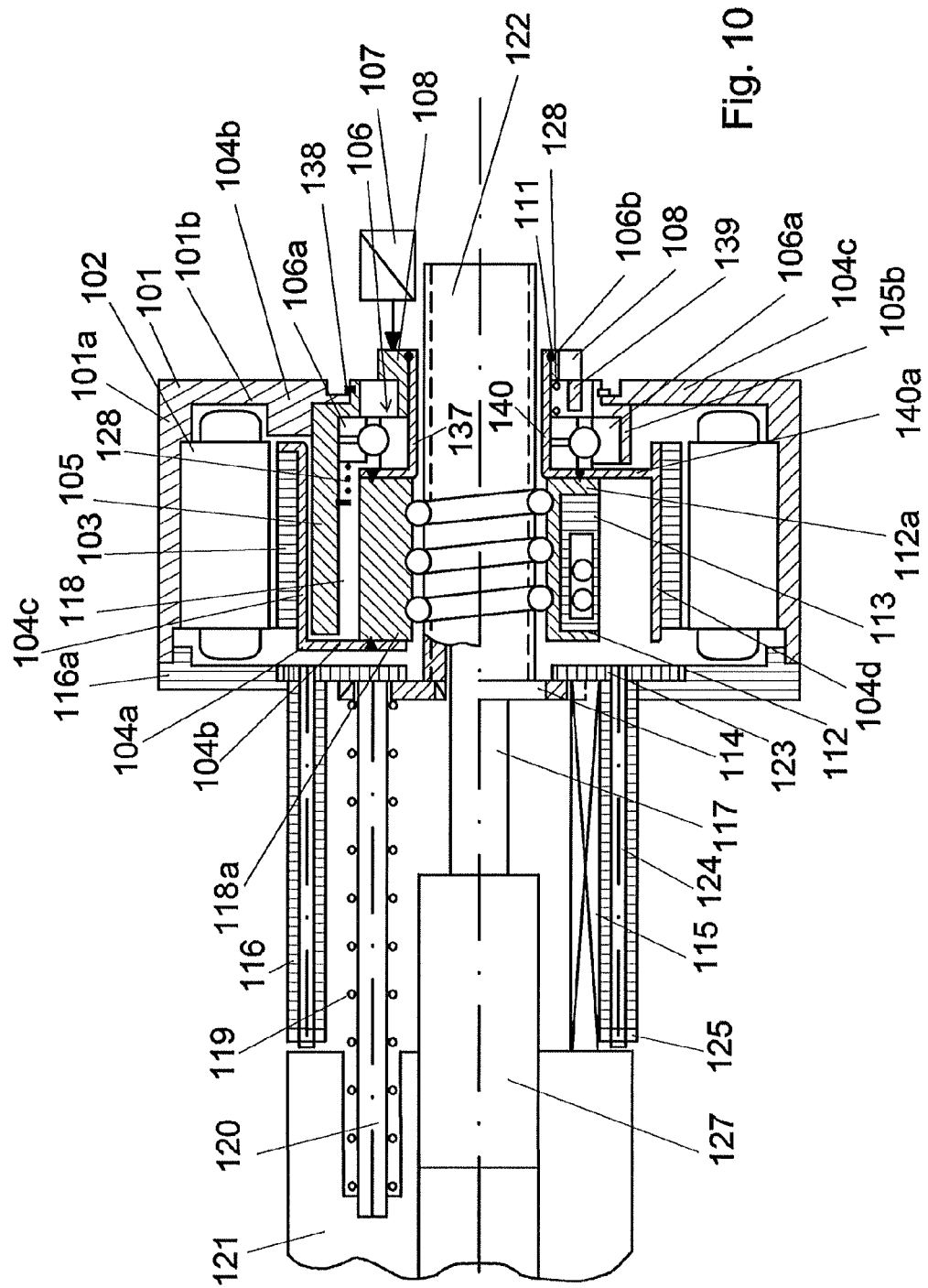
FIG. 10 shows a drive device with motor and ball screw assembly and (partly) a piston-cylinder arrangement which e.g. can be part of a motor vehicle braking system.

FIG. 10 shows a fundamental construction of the drive device having an electric motor, with motor housing 101, stator with winding 102 and rotor with permanent magnet 103 and having a ball screw assembly 118, with nut 118 and screw spindle 122. In the upper part of the figure, a motor with two air gaps is illustrated. The motor housing 101 is essentially cup-shaped in the illustrated longitudinal section, with a cylindrical wall part 101*a* and a radial side wall part 101*b*. A radial wall part 116*a* of an intermediate part or intermediate housing 116 is arranged on the side opposite the side wall part 101*b* and is connected to the cylindrical wall part 101*a* of the motor housing, so that the motor and the ball screw assembly are enclosed.

The rotor has a carrier part or rotor sleeve 104*a* with an essentially U-shape in the longitudinal section, to the outer, axially extending leg 104*c* of which the permanent magnets 103 are attached. The radially extending section or leg 104*b* of the rotor sleeve 104*a* abuts with its radially inner end on the outside of the nut 118*a* of the ball screw assembly 118 and is connected to it there, in particular by means of welding or screwing. The rotor sleeve 104*a*, in particular the axially extending section 104*c*, is thin-walled and carries the magnets 103 and absorbs a part of the magnetic back iron.

A component or the bearing sleeve 105 is attached with one end to the radial section 101*b* of the motor housing 101 and extends with its free end along the axially extending section 104*c* of the rotor until close to its radial section 104*b*. The attachment can be made in various ways, appropriately by means of a stepped or offset section which engages with an opening in the motor housing 101 and by means of a locking ring 138 or by means of another in particular form-fit connection. The bearing sleeve 105 acts as an inner stator and absorbs the rest of the back iron of the magnets.

A four-point contact bearing 106 is provided for supporting the rotor, which is seated firmly with its outer ring 106*a* inside the bearing part 105, wherein the outer ring abuts on a shoulder formed by the bearing part 105. The outer bearing ring 106*a* is designed split and can be preloaded by means of a spring 128 supported on the bearing part 105. It can also be designed non-split, as in the lower half of the figure. The inner bearing ring 106*b* is non-split here and is seated firmly on a bearing flange sleeve 137 which in the longitudinal section illustrated is in each case L-shaped. The radial section of the sleeve 117 abuts on the nut 118 of the ball screw assembly and is attached to it in a form-fit or force-fit manner and in particular as illustrated by means of welding. In addition, a sensor wheel 108 of a motor sensor 107 is arranged on the axially extending section of the sleeve 137 and is connected in a force-fit or form-fit manner and in particular as illustrated by means of welding. A spring mechanism or a distance ring can be provided between the sensor wheel 108 and the inner bearing ring 6*b*.

The bearing support is hence designed in such a way that a single bearing is sufficient, wherein essentially all forces transferred by the bearing are conveyed into the motor housing on one side, in particular its radial section.

In the lower half of the figure, the motor with one air gap is illustrated. Here, a bearing part 105*b* is provided which, as described above with regard to the bearing part 105, is attached to the motor housing 101, but is only relatively short. The bearing part 105*b* can also be integrally formed with the housing. The rotor sleeve 104*d* of this embodiment is, at least in its axial section, dependent on the magnets used, formed with thicker walls, wherein the back iron of the magnets, in accordance with conventional motor technology, flows via the magnets themselves or the rotor casing.

The outer bearing ring 106*a* of the four-point-contact bearing is in this embodiment non-split and is seated firmly in the bearing part 105*b*. The inner bearing ring 106*b* is designed split and is seated firmly or with a close sliding fit on a bearing sleeve 140 which, like the sleeve 137, is attached with a radially extending section 140*a* to the nut of the ball screw assembly. Here, the radial section 140*a* is extended and connected to the rotor sleeve 4*d* by corresponding shaping. As in the embodiment illustrated in the upper half, a sensor wheel for a motor sensor is seated on the sleeve 140, wherein a spring mechanism 128 is provided between the sensor wheel and the bearing ring.

The outer bearing ring of the four-point-contact bearing essentially determines the undesired tilt angle and hence the eccentricity of the rotor. Therefore, according to the invention, precisely pressing the outer ring into the bearing part 105 or 105b has a beneficial effect and the resulting parallelism of the ball track to the collar of the bearing part 105 or 5b which is seated in the motor housing 101 and possibly manufacturing or assembling together with the bearing ring 105 or 105b, in order to obtain tolerances which are as small as possible. The small tolerance chain brings considerable advantages. The stator is also pressed in or contracted at right angles to this support in the motor housing. The bearing parts 105 or 105b are e.g. fixed in place e.g. via locking ring 138 on the motor housing 101 or alternatively caulked or crimped. The bearing flange sleeve 137 or 140 and the rotor 104a or 104d are connected in a form-fit or force-fit manner to the nut 48 of the ball screw assembly. The sleeve 140 receives the inner ring of the four-point contact bearing with relatively small tolerances as a light close sliding fit or press fit. The four-point contact bearing can have a split inner ring or a split outer ring. A split inner ring in conjunction with a preloading of the bearing is particularly advantageous. The preloading is effected via spring elements. When the drive device is used for brake pressure modulation, primarily axial forces act by means of the compressive force which comes from the master cylinder piston, but radial forces also have an effect, as a result of the torque support and coupling of the spindle to the master cylinder piston in the case of spindle run-out, and additional radial forces due to the rotor. Normally, the axial forces prevail but in a marginal case with extremely low pressure the axial force can have a negative effect, which by means of the preloading of the bearing or of the split bearing ring can be compensated with little clearance to the ball.

The rotor or the rotor sleeve 104a and the sleeve 137 are formed separate in the upper embodiment, which is advantageous for the assembly of the magnets on the rotor, which can take place independently of the ball screw assembly-bearing unit. In the embodiment illustrated in the lower half of the figure, the rotor 104d is connected to the sleeve 140, which is more difficult for assembly. Here, the rotor must already be equipped with magnets before it can be made complete with the ball screw assembly and the four-point contact bearing. The outer bearing ring, split or non-split, can also be directly incorporated into the bearing part 105 or 105b.

In the case of a motor control defect, the motor supported by the compressive force, e.g. of the master cylinder piston of a braking system, can move the screw spindle with coupling flange 14 against the nut 118a of the ball screw assembly 118, which due to impact load would load the ball screw assembly too heavily or possibly moves the nut in the opposite direction and hence the inner ring of the four-point contact bearing too. Therefore, a stop with a clearance "s" for such a movement is provided by a distance ring 139 in FIG. 10 or a corresponding distance "s" from the gear wheel carrier 131 to the sensor wheel 108 in FIG. 11. A stop plate 123 is provided on the intermediate house 116, with which the coupling flange 114 engages, or a stop by means of a spring 123a which engages with a stop washer 123b (FIG. 12). The stop plate 123 is connected to the intermediate housing 116 via elastic bolts 124. Damage can thereby be prevented in the case described.

The screw spindle 122 of the ball screw assembly travels with a small clearance in the screw spindle nut 118a. Here, there is a risk that the greased screw spindle takes up foreign particles and drags them into the nut, which can ultimately lead to a blockage. The area in which e.g. abraded material from the sensor gear wheel reaches the screw spindle or from the rotor if it e.g. has a casing consisting of plastic as magnetic protection, is particularly at risk. Wear debris can also reach the screw spindle from the spring 123a of the screw spindle stop. For the first case, a screw spindle cap 134 is connected to the sleeve 137 (FIG. 11). For rotor protection, a protective sleeve 130 is connected to it which plunges into the intermediate housing 116 and in this way forms a labyrinth (FIG. 12).

In order to reduce the rotating mass, the nut 118a of the ball screw assembly is provided with a recess, as can be seen in the lower half of the figure, which is left open to receive a ball retainer 113, wherein the two narrow flanges 112 and 112a limiting the recess form lateral limits of the recess. These flanges in design are formed for minimal rotating mass. The ball return is effected in a ball retainer, preferably in a plastic retainer. The ball return can be effected in a single-row or double-row parallel or at a certain angle to the axis of 30-60°. This open design can reduce the rotating mass of the ball screw assembly by up to 70%.

The screw spindle drive requires a reset which is connected particularly easily by means of a coupling flange 114 which is supported axially and torque-proof by the screw spindle 122. One or preferably two reset springs 119 are supported on the flange 114 and are guided by a guiding bolt 120 which is mounted in the housing 121 or also additionally in the intermediate housing 116.

The torque is supported via the same coupling flange 114 which also grips two supports 115 which are preferably offset by 180°.

The coupling flange (not illustrated) can also be designed as an Oldham coupling to compensate the screw spindle run-out during a rotation by 360 degrees. The illustrated coupling to the support 115 only enables a movement over 180 degrees.

The drive element 127, e.g. a piston, is preferably actuated by a coupling element 130, which is connected to the screw spindle 122, in order to be carried along in both directions when the screw spindle moves.

FIG. 11 shows another embodiment of the bearing support of the rotor in a detail. Here, the split designed inner ring of the four-point contact bearing 106 is formed on one side by a sleeve-shaped inner bearing ring 137b which is connected to the nut of the ball screw assembly, in particular welded, and which extends axially beyond the bearing. A sleeve is seated on this bearing ring 137b as a gear wheel carrier 131, similar to the sleeve described above with regard to FIG. 10. The sleeve 131 has a radial section which abuts in an elastic manner on the balls of the bearing. Through the position or course of the radial section (alpha angle) the angle of obliquity of the ball contact, and hence the radius, can be optimised. The sleeve 131 is preferably connected to the sleeve-like bearing ring by means of a form-fit connection or deformation 129, as can be seen in FIG. 11a. Again, a sensor wheel 108 of a motor sensor is seated on the sleeve. An additional thin sleeve 134 can be caulked within the bearing ring 137b, this thin sleeve 134 in particular extending over the entire length of the screw spindle on the other side of the ball screw assembly nut and protecting it against accruing foreign particles.

In FIG. 12, a further embodiment of the rotor and the bearing support is illustrated. Here, in the illustrated longitudinal section, the rotor sleeve 104 is essentially U-shaped and encompasses the bearing part 105a acting as the inner stator. Permanent magnets 103 are attached to the outside of the rotor sleeve 104 and are provided with a protective casing. The inner leg of the rotor sleeve 104 is seated on a sleeve 110a which in turn is seated on the nut of the ball screw assembly. The bearing sleeve 137 is attached to the end face of the sleeve 110a, in particular by means of welding, wherein a bent round end of the rotor sleeve encompasses the radially external end of the bearing sleeve. An end piece of an intermediate housing is indicated with 116. A protective sleeve 130, which in longitudinal section is approximately L-shaped or Z-shaped, is attached to the rotor and protects the space between the rotor and the intermediate housing from foreign particles. A spring 123a supporting itself, on the one hand, on the screw spindle and, on the other hand, on a support plate 123b, acts as a screw spindle stop spring. A protective ring 132 is arranged between the support plate 123b and the end of the nut of the ball screw assembly.

Here, the four-point contact bearing has a split inner ring 151 which is seated on the axially extending section of the bearing sleeve. In this example, the inner rings are dimensioned in such a way that on contact with the adjacent ring a small clearance to the circulating balls occurs, which only results in a small pivot clearance. A sealing ring 127 is attached to the outside of the bearing. A spring preloading device 128 is provided between the inner ring of the bearing and a gear wheel carrier 131 firmly attached to the bearing sleeve by means of a form-fit connection, which here consists of two disc springs. The invention is presented in the description using an example of an internal rotor motor; it can also be applied with external rotor motors.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claimed:

1. A drive device for modifying hydraulic pressure of a brake, comprising:
   an inner rotor motor;
   a gear transmission arranged to act on a piston of a hydraulic brake pressure modifier and comprising a rotating gear transmission part that is a nut or spindle of a spindle gear, wherein the hydraulic brake pressure modifier is configured to act on the piston of the hydraulic brake pressure modifier;
   a motor housing;
   a stator with winding and forming a part of the inner rotor motor; and
   a rotor with at least one permanent magnet, wherein the rotor is disposed radially inside the stator and forms a part of the inner rotor motor;
   wherein the motor housing has a motor housing part extending essentially radially on one side of the stator,
   wherein one or more bearings for the rotor and the gear transmission is/are arranged in the motor housing or on the motor housing part or on a component firmly connected to the motor housing part,
   wherein the one or more bearings lie radially between the spindle and the stator of the inner rotor motor, and
   wherein the one or more bearings is/are arranged on only one side in the motor housing or on the motor housing part, wherein there is no bearing on another side in the motor housing or on the motor housing part, wherein the only one side of the motor housing or motor housing part is defined by a side of a radial plane passing through the rotor, and which is oriented perpendicular to an axis of rotation of the rotating gear transmission part, so that bearing forces are at least substantially absorbed by the only one side of the motor housing or the motor housing part,
   wherein the piston of the brake pressure modifier is located on the another side of the motor housing or the radial plane, having no bearings.

2. The drive device according to claim 1, wherein a bearing is partly integrated into the rotating gear transmission part.

3. The drive device according to claim 1, further comprising a ring arranged between the bearing component and the motor housing and configured to make a form-fit connection.

4. The drive device according to claim 1, wherein the component connected to the housing forms an inner stator.

5. The drive device according to claim 1, wherein the rotor is connected to the rotating gear transmission part or to a nut of a ball screw assembly.

6. The drive device according to claim 1, wherein the motor has one or two air gaps between the stator and the rotor.

7. The drive device according to claim 1, further comprising a device configured to reset an axially movable part of the gear transmission, wherein the device is arranged in a housing of the drive device outside the motor housing, and wherein the device is configured to be actuated by a reset spring and includes a coupling element.

8. The drive device according to claim 1, wherein only one bearing is provided for the rotor and the rotating gear transmission part, wherein the bearing is designed as a four-point contact bearing or a double angular contact ball bearing.

9. The drive device according to claim 1, wherein a thrust bearing and a radial bearing are provided for the rotor and the rotating gear transmission part.

10. The drive device according to claim 1, wherein two thrust ball bearings are provided for the rotor and the rotating gear transmission part.

11. The drive device according to claim 1, wherein, between an axially external bearing and a locking ring, an axial clearance is arranged to be set with respect to the bearing, in which a space relative to a spring element is arranged.

12. The drive device according to claim 1, including a four-point contact bearing comprising an inner bearing ring and an outer bearing ring, wherein the inner bearing ring or the outer bearing ring of the four-point contact bearing is designed split.

13. The drive device according to claim 1, further comprising a protective sleeve between the rotor end and an intermediate housing.

14. The drive device according to claim 1, further comprising a support ring provided for rotating parts of the motor or gear transmission, wherein the support ring is arranged on a nut of a ball screw assembly, on the stator or on the component connected to the housing.

15. The drive device according to claim 1, wherein the one or more bearings comprise at least two bearings.

16. The drive device according to claim 1, further comprising a device provided for supporting torque of a non-rotating gear transmission part, wherein this device is provided on a side of the rotating gear transmission part which is opposite the bearing support.

17. The drive device according to claim 16, wherein the device for supporting the torque is arranged in a housing of the drive device, outside the motor housing, in which pistons of a master cylinder are also arranged.

18. The drive device according to claim 1, wherein the component connected to the motor housing part is connected on one side of the motor housing by crimping or caulking.

19. The drive device according to claim 18, wherein the component connected to the motor housing part includes a collar configured for centering in the motor housing.

20. A drive device for modifying hydraulic pressure of a brake, comprising:
- an inner rotor motor;
- a gear transmission arranged to act on a piston of a hydraulic brake pressure modifier and comprising a rotating gear transmission part that is a nut or a spindle of a spindle gear, wherein the hydraulic brake pressure modifier is configured to act on the piston of the hydraulic brake pressure modifier;
- a motor housing;
- a stator with a winding and forming a part of the inner rotor motor;
- a rotor with at least one permanent magnet, wherein the rotor is disposed radially inside the stator and forms a part of the inner rotor motor; and
- at least one bearing provided for a bearing support of the rotor and a rotating gear transmission part,
- wherein the at least one bearing for the rotor and rotating gear transmission part is/are arranged on a motor housing part or on a component firmly connected to the motor housing part,
- wherein the at least one bearing lies radially between the spindle and the stator of the inner rotor motor,
- wherein the at least one bearing is arranged on a component connected to or integrated with the rotating gear transmission part,
- wherein the at least one bearing is/are arranged on only one side in the motor housing or on the motor housing part, wherein another side of the motor housing or motor housing part has no bearings, and wherein the only one side of the motor housing or motor housing part is defined by a side of a radial plane passing through the rotor, and which is oriented perpendicular to an axis of rotation of the rotating gear transmission part, so that bearing forces are at least substantially absorbed by the only one side of the motor housing or the motor housing part, and
- wherein the hydraulic brake pressure modifier is located on the another side of the motor housing or the radial plane, having no bearings.

21. The drive device according to claim 20, wherein the component connected to or integrated with the rotating gear transmission part is connected to a sensor drive.

22. The drive device according to claim 20, wherein the nut of the ball screw assembly has at least one recess for reducing the rotating mass.

23. The drive device according to claim 20, wherein the at least one bearing comprises at least two bearings.

24. The drive device according to claim 20, wherein the rotating gear transmission part is a nut of a ball screw assembly.

25. The drive device according to claim 24, wherein a connection is provided between the nut of the ball screw assembly and a bearing ring of the at least one bearing, so that a clearance, a pivot clearance, or both are enabled to be set between an inner bearing ring and an outer bearing ring.

26. The drive device according to claim 24, wherein the ball screw assembly, a bearing ring and the at least one bearing and a sensor target or sensor wheel of a rotation sensor form an assembly unit.

27. The drive device according to claim 24, wherein a stop is provided for a screw spindle of the ball screw assembly.

28. The drive device according to claim 24, wherein a protective device is provided for a screw spindle of the ball screw assembly, wherein a thin cap or sleeve is arranged to enclose a periphery of the screw spindle.

29. A drive device for of modifying hydraulic pressure of a brake, comprising:
- an inner rotor motor;
- a gear transmission arranged to act on a piston of a hydraulic brake pressure modifier and comprising a rotating gear transmission part that is a nut or a spindle of a spindle gear, wherein the hydraulic brake pressure modifier is configured to act on the piston of the hydraulic brake pressure modifier;
- a motor housing;
- a stator with a winding and forming a part of the inner rotor motor; and
- a rotor with at least one permanent magnet, wherein the rotor is arranged radially inside the stator and forms a part of the inner rotor motor,
- wherein the motor housing includes a motor housing part extending essentially radially on one side of the stator, and wherein the rotor has at least two rotor bearings,
- wherein the at least two rotor bearings lie radially between the spindle and the stator of the inner rotor motor,
- wherein the at least two rotor bearings are arranged on only one side in the motor housing or on the motor housing part, wherein another side of the motor housing or motor housing part has no bearing, and wherein the only one side of the motor housing or motor housing part is defined by a side of a radial plane passing through the rotor, and which is oriented perpendicular to an axis of rotation of the rotating gear transmission part, so that bearing forces are at least substantially absorbed by the only one side of the motor housing or the motor housing part,
- wherein the rotor bearings are arranged on a part connected to the motor housing part and extending essentially axially, and
- wherein the piston of the hydraulic brake pressure modifier is located on the another side of the motor housing or of the radial plane, having no bearings.

* * * * *